US012670442B2

(12) United States Patent　　　　　(10) Patent No.:　US 12,670,442 B2
Hsu et al.　　　　　　　　　　　　　　　(45) Date of Patent:　Jun. 30, 2026

(54) ARTIFICIAL INTELLIGENCE CAPSULE POSITIONING SYSTEM

(71) Applicant: AUDEN TECHNO CORP., Taoyuan City (TW)

(72) Inventors: Yung-Tai Hsu, Taoyuan City (TW); Yen-Wei Wang, Taoyuan City (TW); Chan-Cheng Lin, Taoyuan City (TW)

(73) Assignee: AUDEN TECHNO CORP., Taoyuan City (TW)

( * ) Notice: Subject to any disclaimer, the term of this patent is extended or adjusted under 35 U.S.C. 154(b) by 792 days.

(21) Appl. No.: 18/153,994

(22) Filed: Jan. 12, 2023

(65) Prior Publication Data

US 2024/0242111 A1　　Jul. 18, 2024

(51) Int. Cl.
　　G06N 20/00　　　　　(2019.01)
(52) U.S. Cl.
　　CPC .................................. G06N 20/00 (2019.01)
(58) Field of Classification Search
　　CPC ..................................................... G06N 20/00
　　USPC .......................................................... 706/12
　　See application file for complete search history.

(56) References Cited

U.S. PATENT DOCUMENTS

2003/0191430 A1 * 10/2003 D'Andrea .............. A61B 1/041
　　　　　　　　　　　　　　　　　　　　　　　600/593
2014/0163357 A1 * 6/2014 Higaki ................. G01S 5/0226
　　　　　　　　　　　　　　　　　　　　　　　600/424

2018/0353133 A1 * 12/2018 Imran ..................... A61B 5/073
2019/0125173 A1 * 5/2019 Lee ........................ G06T 7/0012
2021/0267438 A1 * 9/2021 Velis .................. A61B 1/00006
2022/0047154 A1 * 2/2022 Prior ...................... A61B 34/30

FOREIGN PATENT DOCUMENTS

CN　　　108354578 A * 8/2018　............. A61B 1/045
CN　　　108784636 A * 11/2018　......... A61B 1/00009
KR　　　20180128216 A * 12/2018　............. G06N 99/00

OTHER PUBLICATIONS

Hwang et al., "Bayesian inference-based tracking for wireless capsule endoscopes", 2014 International Conference on Information and Communication Technology Convergence (ICTC), Oct. 22-24, 20214, pp. 277-282. (Year: 2014).*

(Continued)

*Primary Examiner* — Hwei-Min Lu
(74) *Attorney, Agent, or Firm* — Li & Cai Intellectual Property Office

(57)　　　　　　　ABSTRACT

An artificial intelligence capsule positioning system is provided. An artificial intelligence capsule positioner of the artificial intelligence capsule positioning system collects multiple pieces of measured data related to a capsule. The multiple pieces of measured data include a direction vector and a spatial coordinate of the capsule, frequencies and strengths of signals transmitted by a signal transmitter on the capsule, and strengths of the signals received by antennas. The artificial intelligence capsule positioner uses an artificial intelligence machine learning algorithm to learn the multiple pieces of measured data from a database to analyze rules for how a position of the capsule changes with the multiple pieces of measured data to establish a training model. When a new capsule flows in a human body, the artificial intelligence capsule positioner uses the training model to position the new capsule.

8 Claims, 8 Drawing Sheets

(56) References Cited

OTHER PUBLICATIONS

Wang et al/. "Positioning algorithm for wireless capsule endoscopy based on RSS",2016 IEEE International Conference on Ubiquitous Wireless Broadband (ICUWB), Oct. 16-19, 2016, pp. 1-3. (Year: 2016).*

Turan et al., "Endo-VMFuseNet: A Deep Visual-Magnetic Sensor Fusion Approach for Endoscopic Capsule Robots", 2018 IEEE International Conference on Robotics and Automation (ICRA), May 21-25, 2018, Brisbane, Australia, pp. 5386-5392. (Year: 2018).*

Oleksy et al., "Wireless Capsule Endoscope Localization with Phase Detection Algorithm and Adaptive Body Model", Sensors 2022, 22, 2200, Mar. 11, 2022, pp. 1-19. (Year: 2022).*

Jiang et al., "A Machine Learning Enabled Near Infrared Tracking Scheme for Localization of Gastrointestinal Smart Capsule", IEEE Access, vol. 10, Sep. 9, 2022, pp. 92481-92490. (Year: 2022).*

Zhang et al., "Deep Reinforcement Learning-Based Control for Stomach Coverage Scanning of Wireless Capsule Endoscopy", 2022 IEEE International Conference on Robotics and Biomimetics (ROBIO), Dec. 5-9, 2022, pp. 1964-1969. (Year: 2022).*

Liu et al., "Capsule robot pose and mechanism state detection in ultrasound using attention-based hierarchical deep learning", Scientific Reports, 12, 21130, Dec. 7, 2022. (Year: 2022).*

* cited by examiner

| Input Vector Number | Direction of Antenna of Capsule | Bluetooth Broadcast Channel | Signal Strength Indication of Antenna that is numbered "1" above Belt | ... | Signal Strength Indication of Antenna that is numbered "8" above Belt | Signal Strength Indication of Antenna that is numbered "1" under Belt | ... | Signal Strength Indication of Antenna that is numbered "8" under Belt |
|---|---|---|---|---|---|---|---|---|
| 1 | 0 | 37 | 0 | ... | -49 | | ... | 12 |
| 2 | 0 | 38 | -24 | ... | -47 | | ... | |
| 3 | 0 | 39 | -21 | ... | -51 | | ... | |
| 4 | 0 | 37 | -46 | ... | -49 | | ... | |
| 5 | 0 | 38 | -23 | ... | -48 | | ... | |
| 6 | 0 | 39 | -21 | ... | -48 | | ... | |
| 7 | 0 | 37 | -45 | ... | -49 | | ... | |
| 8 | 0 | 38 | -23 | ... | -47 | | ... | |
| 9 | 0 | 39 | -22 | ... | -53 | | ... | |
| 10 | 0 | 37 | -38 | ... | -49 | | ... | |

FIG. 7

| Output Vector Number | v1 | v2 | v3 | ... | v88 | v89 | v90 |
|---|---|---|---|---|---|---|---|
| 1 | 1 | 0 | 0 | ... | 0 | 0 | 0 |
| 2 | 0 | 1 | 0 | ... | 0 | 0 | 0 |
| ... | 0 | 0 | 1 | ... | 0 | 0 | 0 |
| ... | 0 | 0 | 0 | ... | 0 | 0 | 0 |
| ... | 0 | 0 | 0 | ... | 0 | 0 | 0 |
| ... | 0 | 0 | 0 | ... | 0 | 0 | 0 |
| ... | 0 | 0 | 0 | ... | 0 | 0 | 0 |
| 88 | 0 | 0 | 0 | ... | 1 | 0 | 0 |
| 89 | 0 | 0 | 0 | ... | 0 | 1 | 0 |
| 90 | 0 | 0 | 0 | ... | 0 | 0 | 1 |

FIG. 9

| Spatial Coordinate Number | X Axis | Y Axis | Z Axis |
|---|---|---|---|
| 1 | 5 | 33 | 42 |
| 2 | 7 | 33 | 42 |
| 3 | 9 | 33 | 42 |
| 4 | 11 | 33 | 42 |
| 5 | 13 | 33 | 42 |
| 6 | 15 | 33 | 42 |
| 7 | 15 | 35 | 42 |
| 8 | 13 | 35 | 42 |
| 9 | 11 | 35 | 42 |
| 10 | 9 | 35 | 42 |

FIG. 8

ARTIFICIAL INTELLIGENCE CAPSULE POSITIONING SYSTEM

FIELD OF THE DISCLOSURE

The present disclosure relates to a positioning system, and more particularly to an artificial intelligence capsule positioning system.

BACKGROUND OF THE DISCLOSURE

In recent years, medical capsules such as endoscopic capsules have been commonly used for medical diagnosis of physical health, such as for determining the health condition of a human digestive system. However, these medical capsules cannot be accurately positioned by a conventional positioning system. Therefore, after a patient swallows the medical capsule and the medical capsule captures images at a regular time intervals, a doctor can only use their own clinical experience to make a rough assessment and diagnosis of the physical health of the patient based on the images captured by the medical capsules.

SUMMARY OF THE DISCLOSURE

In response to the above-referenced technical inadequacies, the present disclosure provides an artificial intelligence capsule positioning system. The artificial intelligence capsule positioning system includes a signal transmitter, a plurality of signal receivers and an artificial intelligence capsule positioner. The signal transmitter is disposed on a capsule. The signal transmitter is configured to transmit a plurality of capsule signals when the capsule is placed into and flows in a tested body. The plurality of signal receivers are wirelessly connected to the signal transmitter. The plurality of signal receivers are configured to wirelessly receive the plurality of capsule signals from the signal transmitter. The artificial intelligence capsule positioner is wirelessly connected to the plurality of signal receivers. The artificial intelligence capsule positioner includes a data collecting unit, a training model establishing unit, and a capsule positioning unit. The data collecting unit is configured to establish a database and to collect multiple pieces of measured data associated with the capsule to the database. The multiple pieces of measured data include a direction vector and a spatial coordinate of the capsule on which the signal transmitter transmits each of the plurality of capsule signals, a frequency and a strength of each of the plurality of capsule signals transmitted by the signal transmitter, and a strength of each of the plurality of capsule signals respectively received by the plurality of signal receivers. The training model establishing unit is connected to the data collecting unit. The training model establishing unit is configured to use an artificial intelligence machine learning algorithm to learn the multiple pieces of measured data from the database. The training model establishing unit is configured to analyze rules for how a position of the capsule changes with the multiple pieces of measured data, so as to establish a training model. The capsule positioning unit is connected to the training model establishing unit. The capsule positioning unit is configured to use the training model to instantly position the capsule flowing in a human body to obtain a position of the capsule in the human body.

In certain embodiments, the artificial intelligence capsule positioner further includes a capsule flowing speed calculating unit. The capsule flowing speed calculating unit is connected to the capsule positioning unit. The capsule flowing speed calculating unit is configured to calculate a flowing speed of the new capsule in the human body, according to a time that the capsule has been placed into the human body and the position of the new capsule in the human body from the capsule positioning unit.

In certain embodiments, the artificial intelligence capsule positioner further includes an error gain calculating unit. The error gain calculating unit is connected to the capsule positioning unit. The error gain calculating unit is configured to determine a ratio relationship between an estimated position of the capsule and the position of the capsule that is positioned by the capsule positioning unit using the training model to calculate a gain.

In certain embodiments, the error gain calculating unit substitutes the position of the capsule that is positioned at a current moment by the capsule positioning unit using the training model, the estimated position of the capsule at the current moment and an estimated position of the capsule at a previous moment into the following equation to calculate the gain:

$$S = K \times Z + (1 - K) \times X,$$

wherein S represents the estimated position of the capsule at the current moment, K represents the gain, Z represents the position of the capsule that is positioned at the current moment by the capsule positioning unit using the training model, and X represents the estimated position of the capsule at the previous moment.

In certain embodiments, the training model establishing unit is connected to the error gain calculating unit. The training model establishing unit is configured to determine whether or not the training model needs to be retrained according to the gain calculated by the error gain calculating unit.

In certain embodiments, the plurality of signal receivers respectively receive the plurality of capsule signals via BLUETOOTH wireless transmission technology.

In certain embodiments, the multiple pieces of measured data of the database further include data of a broadcast channel through which each of the plurality of capsule signals is transmitted by the signal transmitter.

In certain embodiments, the broadcast channel includes a BLUETOOTH broadcast channel.

In certain embodiments, each of the plurality of signal receivers includes one or more antennas.

As described above, the present disclosure provides the artificial intelligence capsule positioning system. The artificial intelligence capsule positioning system of the present disclosure uses the artificial intelligence machine learning algorithm to learn the multiple pieces of measured data related to the strengths of the plurality of capsule signals received by the plurality of signal receivers such as the antennas. The artificial intelligence capsule positioning system of the present disclosure analyzes the rules for how the strengths of the plurality of capsule signals and the position of the capsule change with the multiple pieces of measured data, so as to establish the training model for accurately positioning the new capsule.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 7 is a schematic diagram of multiple pieces of measured data that are learned by using an artificial intelligence machine learning algorithm in the artificial intelligence capsule positioning system according to the embodiment of the present disclosure;

FIG. 8 is a schematic diagram of multiple pieces of measured data that are learned by using the artificial intelligence machine learning algorithm in the artificial intelligence capsule positioning system according to the embodiment of the present disclosure; and FIG. 9 is a schematic diagram of multiple pieces of measured data that are learned by using the artificial intelligence machine learning algorithm in the artificial intelligence capsule positioning system according to the embodiment of the present disclosure.

DETAILED DESCRIPTION OF THE EXEMPLARY EMBODIMENTS

Figure 1:
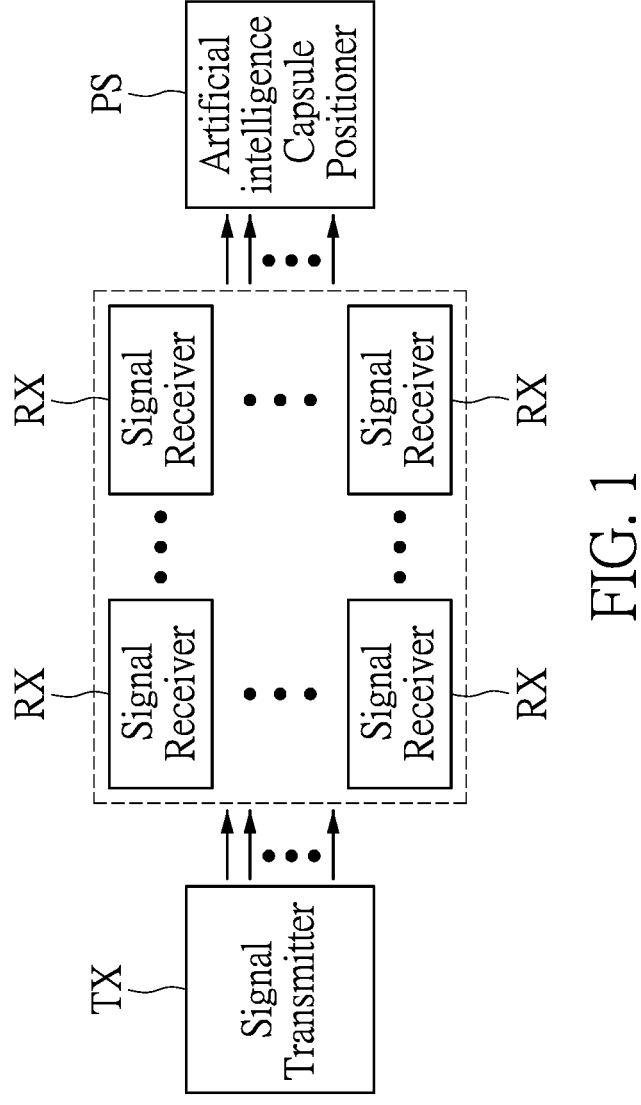
FIG. 1 is a block diagram of an artificial intelligence capsule positioning system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
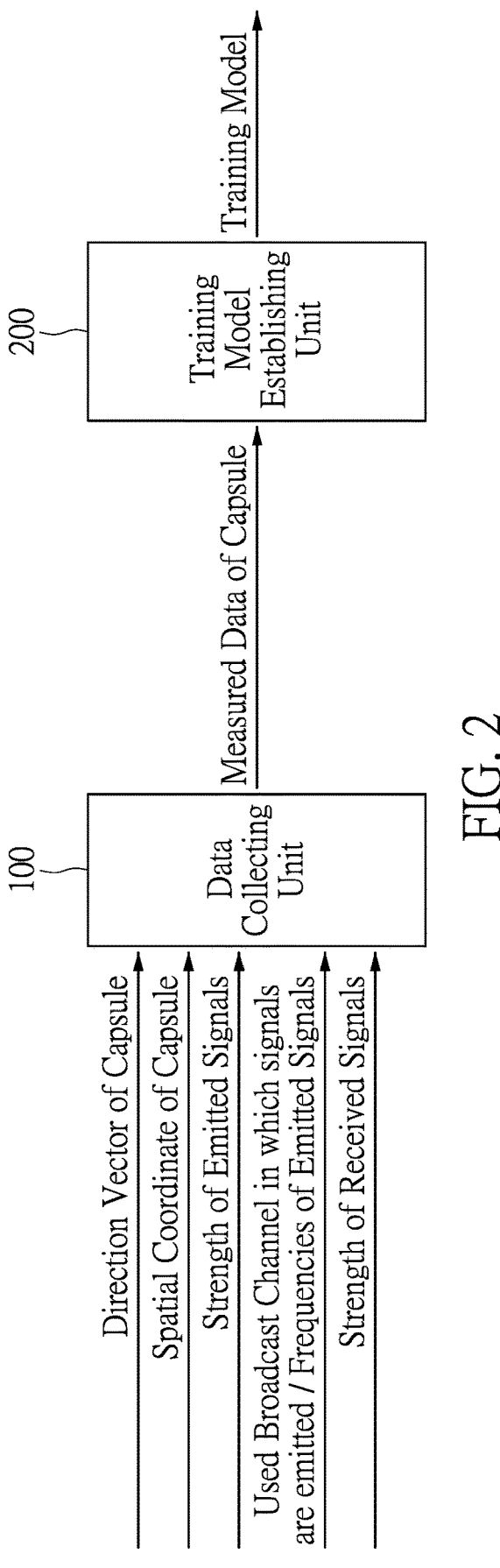
FIG. 2 is a block diagram of an artificial intelligence capsule positioner for establishing a training model in the artificial intelligence capsule positioning system according to the embodiment of the present disclosure.
Figure 3:
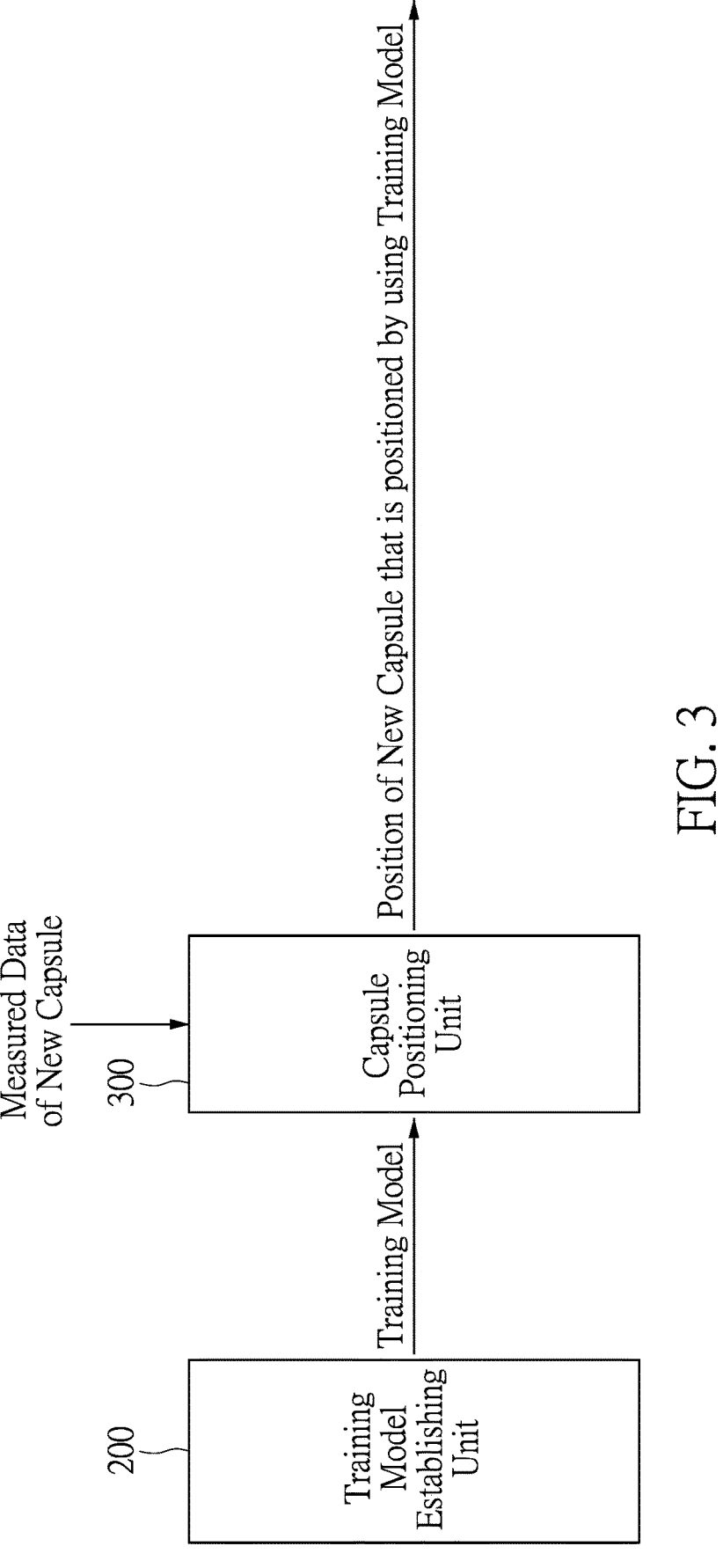
FIG. 3 is a block diagram of the artificial intelligence capsule positioner for positioning a new capsule by using the training model in the artificial intelligence capsule positioning system according to the embodiment of the present disclosure.

Reference is made to FIGS. 1 to 3 and FIGS. 7 to 9, in which FIG. 1 is a block diagram of an artificial intelligence capsule positioning system according to an embodiment of the present disclosure, FIG. 2 is a block diagram of an artificial intelligence capsule positioner for establishing a training model in the artificial intelligence capsule positioning system according to the embodiment of the present disclosure, FIG. 3 is a block diagram of the artificial intelligence capsule positioner for positioning a new capsule by using the training model in the artificial intelligence capsule positioning system according to the embodiment of the present disclosure, and FIGS. 7 to 9 are schematic diagrams of multiple pieces of measured data that are learned by using an artificial intelligence machine learning algorithm in the artificial intelligence capsule positioning system according to the embodiment of the present disclosure.

The artificial intelligence capsule positioning system of the embodiment of the present disclosure may include a signal transmitter TX, a plurality of signal receivers RX and an artificial intelligence capsule positioner PS as shown in FIG. 1. The artificial intelligence capsule positioning system of the embodiment of the present disclosure is applicable to position the (new) capsule. The signal transmitter TX may be wirelessly connected to the plurality of signal receivers RX. The plurality of signal receivers RX may be (wirelessly) connected to the artificial intelligence capsule positioner PS.

The signal transmitter TX shown in FIG. 1 is disposed on the capsule. The plurality of signal receivers RX may be disposed on a carrier. For example, the plurality of signal receivers RX may be averagely distributed in an array on a belt that may be worn on a tested object or a human body, but the present disclosure is not limited thereto. The number of the signal receivers RX may be determined according to actual requirements, and the present disclosure is not limited thereto.

In a test mode, the capsule is placed into the tested object (such as, but not limited to, a body of a lab animal). As shown in FIG. 1, when the capsule flows in the tested object, the signal transmitter TX may continuously or discontinuously transmit a plurality of capsule signals to the plurality of signal receivers RX in a wireless manner.

Each of the plurality of signal receivers RX is separated from the signal transmitter TX by a distance. After the plurality of capsule signals are transmitted by the signal transmitter TX, the plurality of capsule signals may be affected by various conditions. For example, when the plurality of capsule signals are wirelessly transmitted via BLUETOOTH transmission technology by the signal transmitter TX, connection between the signal transmitter TX and the plurality of signal receivers RX may be interfered with or disconnected, which may cause at least part of the plurality of capsule signals to be lost. As a result, the plurality of capsule signals transmitted by the signal transmitter TX are attenuated or distorted to form the plurality of capsule signals received by the plurality of signal receivers RX. The plurality of capsule signals received by the signal receiver RX are different from the plurality of capsule signals transmitted by the signal transmitter TX.

A difference between the capsule having the signal transmitter TX (such as an antenna) and each of the plurality of signal receivers RX (for example, each of the plurality of signal receivers includes one or more antennas) is often calculated according to a strength of each of the plurality of capsule signals received by the plurality of signal receivers RX. The capsule is often positioned according to the differences between the capsule having the signal transmitter TX and the plurality of signal receivers RX (such as the antennas). However, the strengths of the plurality of capsule signals received by the plurality of signal receivers RX are not only affected by the differences between the capsule having the signal transmitter TX and the plurality of signal receivers RX, but also affected by an angle and a position of the signal transmitter TX transmitting each of the plurality of capsule signals, a frequency and a strength of the plurality of capsule signals transmitted by the signal transmitter TX, and other like conditions. Accordingly, the capsule cannot be precisely positioned only according to the strengths of the plurality of capsule signals received by the plurality of signal receivers RX.

Therefore, in the test mode, the capsule is tested multiple times respectively under different conditions affecting the strengths of the plurality of capsule signals received by the signal receiver RX and affecting the position of the capsule. For example, when the signal transmitter TX of the capsule transmits each of the plurality of capsule signals at different angles respectively in different testing operations of the test mode, each of the plurality of capsule signals received by the signal receiver RX has different strengths respectively in the different testing operations, and the capsule is positioned to be at different positions respectively in the different testing operations according to the strengths of the plurality of capsule signals received by the signal receiver RX.

The artificial intelligence capsule positioner PS of the artificial intelligence capsule positioning system of the present disclosure uses the artificial intelligence machine learning algorithm (such as, but not limited to a Backpropagation algorithm) to learn the multiple pieces of measured data related to the plurality of capsule signals that are received by the plurality of signal receivers RX, and to analyze rules for how the position of the capsule changes with the multiple pieces of measured data to establish a training model, as described in detail in the following.

The artificial intelligence capsule positioner PS may include a data collecting unit 100, a training model establishing unit 200 and a capsule positioning unit 300 as shown in FIGS. 2 and 3. The training model establishing unit 200 is connected to the data collecting unit 100 and the capsule positioning unit 300.

In the test mode, as shown in FIG. 2, the data collecting unit 100 may establish a database. The data collecting unit 100 collects the multiple pieces of measured data related (from one or more sensors) to the capsule to the database. The multiple pieces of measured data collected by the data collecting unit 100 may be different from each other and may be measured respectively at different time points. As shown in FIG. 2 and FIGS. 7 to 9, the multiple pieces of measured data collected by the data collecting unit 100 may include a direction vector and a spatial coordinate of the capsule (i.e., the position of the capsule) on which the signal transmitter TX (such as the antenna) is transmitting each of the plurality of capsule signals. The multiple pieces of measured data collected by the data collecting unit 100 may include a (BLUETOOTH) broadcast channel through which each of the plurality of capsule signals is transmitted by the signal transmitter TX (such as the antenna) as shown in FIGS. 2 and 7. The multiple pieces of measured data collected by the data collecting unit 100 may include the frequency and the strength of the plurality of capsule signals transmitted by the signal transmitter TX as shown in FIG. 2, and the strengths of the plurality of capsule signals received by the plurality of signal receivers RX as shown in FIGS. 2 and 7.

In the test mode, as shown in FIG. 2, the training model establishing unit 200 may use the artificial intelligence machine learning algorithm to learn the multiple pieces of measured data from the database of the data collecting unit 100 (or the sensors) to analyze (regular) rules for how the strengths of the plurality of capsule signals received by the plurality of signal receivers RX and the position of the capsule change with the multiple pieces of measured data to establish the training model.

For convenience of description, only the capsule is described herein. However, in the test mode, more capsules may be placed into the tested object for testing for multiple times. It should understood that, the more the pieces of measured data that are used for establishing the training model by the training model establishing unit 200, the higher the accuracy of positioning of the capsule by using the training model.

After the training model is established, the artificial intelligence capsule positioning system of the present disclosure may enter an actual application mode. In actual application mode, the artificial intelligence capsule positioning system of the present disclosure positions other capsules in the human body. For convenience of description, the capsule that is positioned by using the training model is defined as the new capsule as described herein.

In the actual application mode, the new capsule is swallowed into the human body. When the new capsule flows in the human body, the signal transmitter TX of the new capsule transmits the plurality of capsule signals to the plurality of signal receivers RX.

When the new capsule flows in the human body, the capsule positioning unit 300 uses the training model established by the training model establishing unit 200 to instantly position the new capsule in the human body as shown in FIG. 3.

Figure 4:
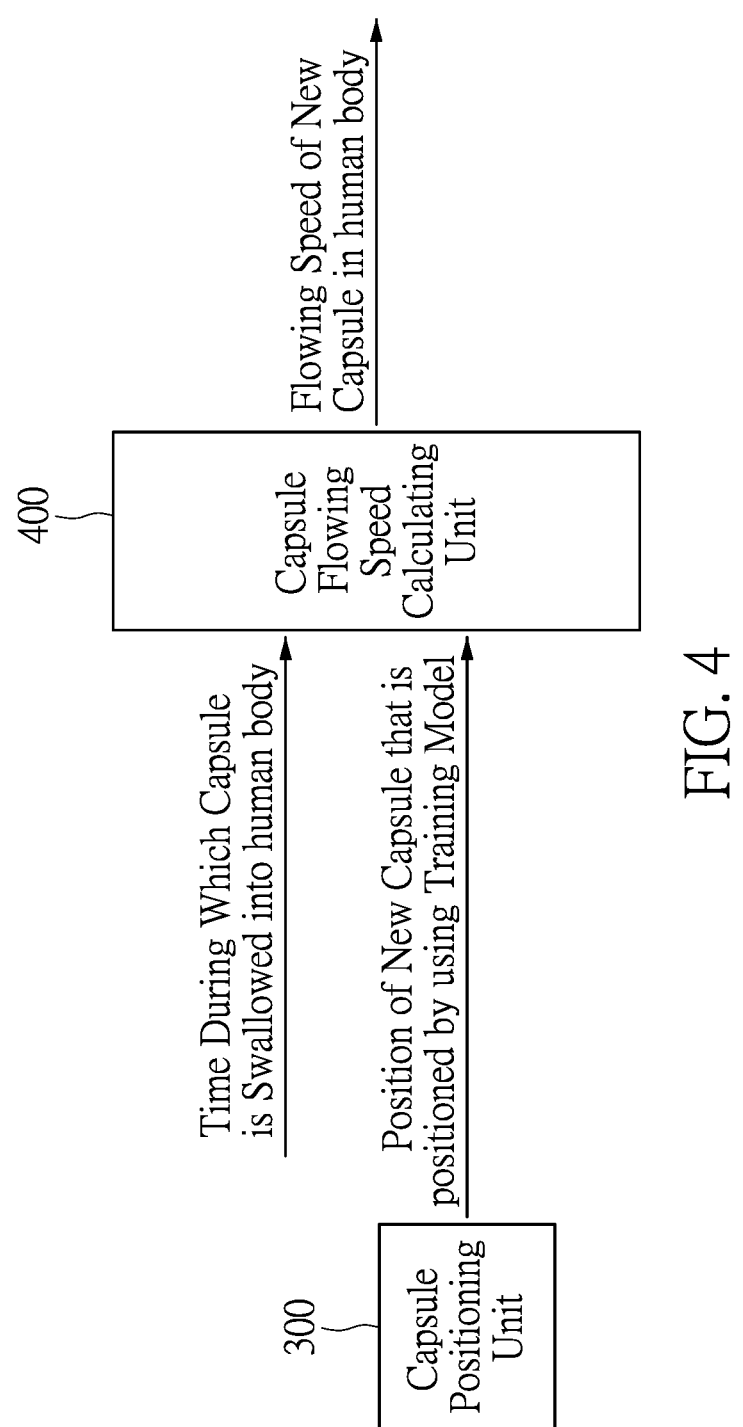
FIG. 4 is a block diagram of the artificial intelligence capsule positioner for calculating a flowing speed of the new capsule in the artificial intelligence capsule positioning system according to the embodiment of the present disclosure.

Reference is made to FIGS. 1 to 4, in which FIG. 4 is a block diagram of the artificial intelligence capsule positioner for calculating a flowing speed of the new capsule in the artificial intelligence capsule positioning system according to the embodiment of the present disclosure.

The artificial intelligence capsule positioning system of the embodiment of the present disclosure may further include a capsule flowing speed calculating unit 400. The capsule flowing speed calculating unit 400 may be connected to the capsule positioning unit 300.

A flowing speed of the (new) capsule changes with a change in the position of the (new) capsule in human body parts or organs such as the stomach and the intestines of the human body. Therefore, as shown in FIG. 4, the capsule flowing speed calculating unit 400 may calculate the flowing speed of the new capsule in the human body, according to data (from the data collecting unit 100, a timer, and so on) such as a time point at which the new capsule is placed into the human body, a length of time during which the new capsule is placed in the human body, and the position of the new capsule that is positioned in the human body by the capsule positioning unit 300.

It should be understood that, the flowing speed of the capsule may be different in human bodies having different health conditions, and thus the health conditions of the human body parts or organs of the human bodies can be determined according to the flowing speeds of the capsules in the human bodies.

Figure 5:
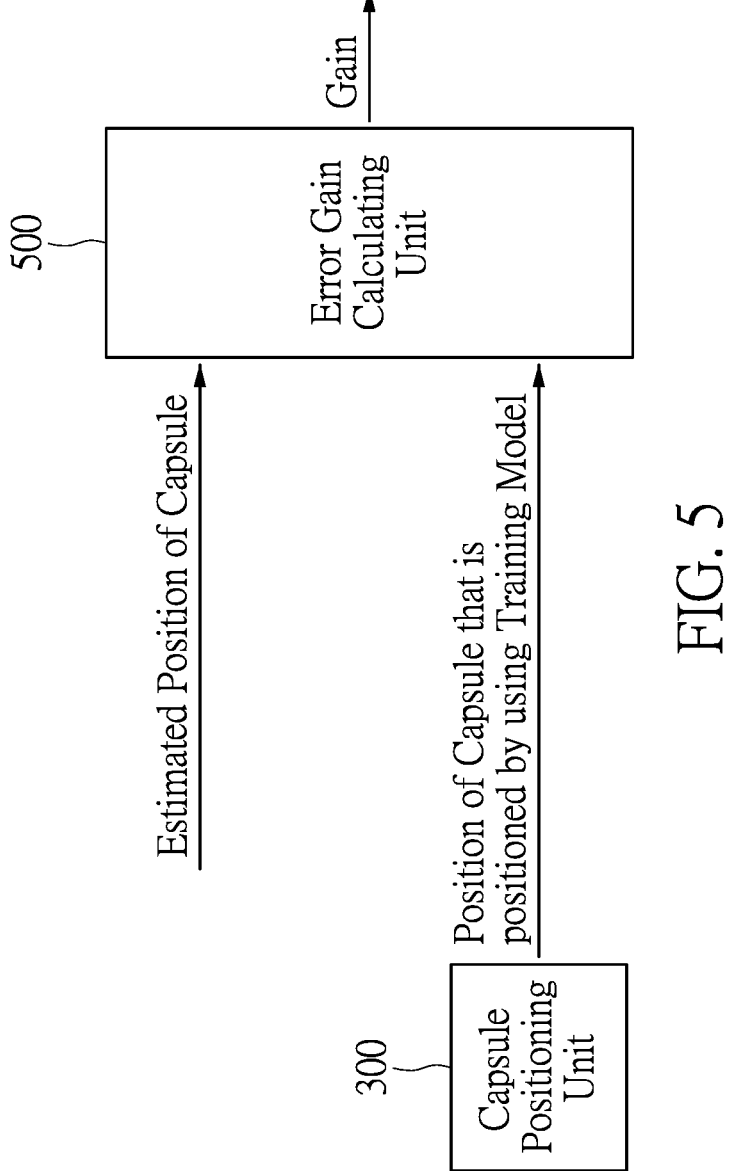
FIG. 5 is block diagram of the artificial intelligence capsule positioner for calculating a relationship between a position of a capsule that is positioned by using the training model and an estimated position in the artificial intelligence capsule positioning system according to the embodiment of the present disclosure.
Figure 6:
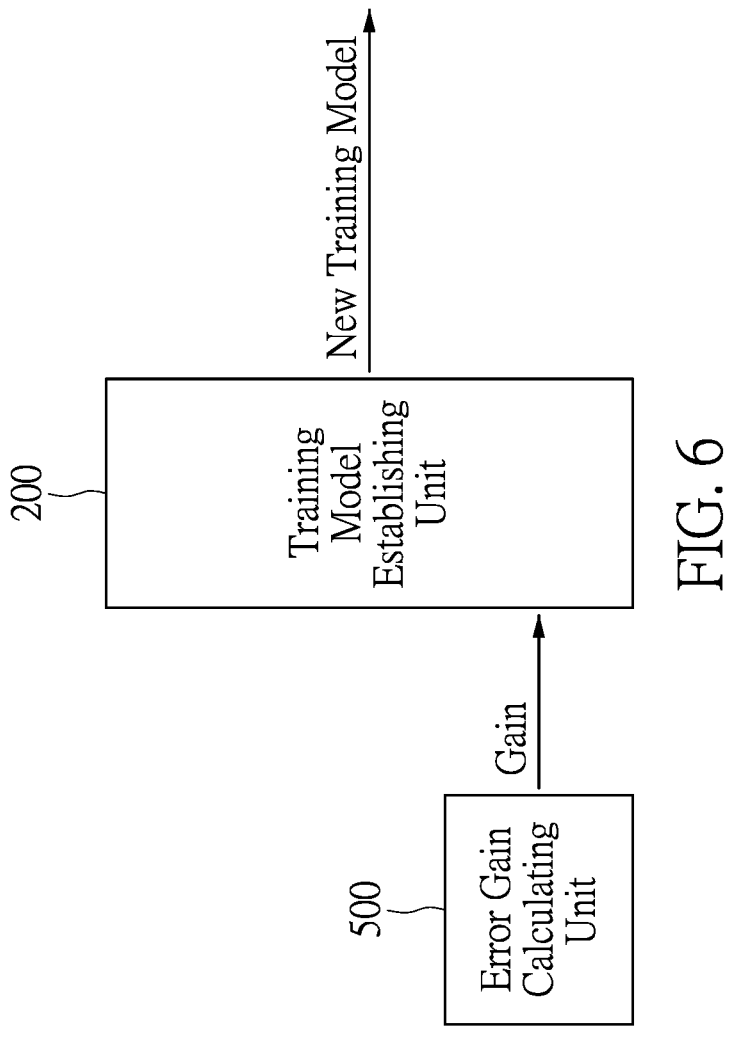
FIG. 6 is block diagram of the artificial intelligence capsule positioner for updating the training model in the artificial intelligence capsule positioning system according to the embodiment of the present disclosure.

Reference is made to FIGS. 5 and 6, in which FIG. 5 is block diagram of the artificial intelligence capsule positioner for calculating a relationship between a position of a capsule that is positioned by using the training model and an estimated position in the artificial intelligence capsule positioning system according to the embodiment of the present disclosure, and FIG. 6 is block diagram of the artificial intelligence capsule positioner for updating the training model in the artificial intelligence capsule positioning system according to the embodiment of the present disclosure.

The artificial intelligence capsule positioning system of the present disclosure may further include an error gain calculating unit 500. The error gain calculating unit 500 may be connected to the training model establishing unit 200 and the capsule positioning unit 300.

As shown in FIG. 5, the error gain calculating unit 500 may calculate a ratio relationship between an estimated position of the capsule and the position of the capsule that is positioned by the capsule positioning unit 300 using the training model at a current moment to calculate a gain. The estimated position of the capsule at the current moment may be determined according to the position of the capsule at a previous moment. For example, the error gain calculating unit 500 substitutes the position of the capsule that is positioned at the current moment by using the training model, the estimated position of the capsule at the current moment and an estimated position of the capsule at the previous moment into the following equation to calculate the gain that is a Kalman gain:

$$S = K \times Z + (1 - K) \times X,$$

wherein S represents the estimated position of the capsule at the current moment, K represents the gain, Z represents the position of the capsule that is positioned at the current moment by using the training model, and X represents the estimated position of the capsule at the previous moment.

The training model establishing unit 200 may, according to the gain from the error gain calculating unit 500, determine whether or not the capsule is accurately positioned by using the training model (that is, determine whether or not the position of the capsule that is positioned by using the training model is the same as or approximates to the estimated position) to determine whether or not the training model needs to be updated. When the training model establishing unit 200 determines that the capsule is not accurately positioned by using the training model according to the gain (for example, the gain that is not equal to a preset gain or that does not fall within a preset gain range), the training model establishing unit 200 may correct the training model or retrain a new training model (such as by using the artificial intelligence machine learning algorithm to learn other pieces of measured data from the database).

The capsule positioning unit 300 may use the corrected training model or the new training model from the training model establishing unit 200 to more accurately position the new capsule.

In conclusion, the present disclosure provides the artificial intelligence capsule positioning system. The artificial intelligence capsule positioning system of the present disclosure uses the artificial intelligence machine learning algorithm to learn the multiple pieces of measured data related to the strengths of the plurality of capsule signals received by the plurality of signal receivers such as the antennas. The artificial intelligence capsule positioning system of the present disclosure analyzes the rules for how the strengths of the plurality of capsule signals and the position of the capsule change with the multiple pieces of measured data to establish the training model for accurately positioning the new capsule.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An artificial intelligence capsule positioning system, comprising:

a signal transmitter disposed on a capsule, and configured to transmit a plurality of capsule signals when the capsule is placed into and flows in a body of a test subject;

a plurality of signal receivers being wirelessly connected to the signal transmitter, and configured to wirelessly receive the plurality of capsule signals from the signal transmitter; and an artificial intelligence capsule positioner being wirelessly connected to the plurality of signal receivers, including:

a data collecting unit including at least one sensor configured to establish a database and to collect multiple pieces of measured data associated with the capsule to the database, wherein the multiple pieces of measured data include a direction vector and a spatial coordinate of the capsule on which the signal transmitter transmits each of the plurality of capsule signals, a frequency and a strength of each of the plurality of capsule signals transmitted by the signal transmitter, and the strength of each of the plurality of capsule signals respectively received by the plurality of signal receivers;

a training model establisher connected to the data collecting unit, configured to use an artificial intelligence machine learning algorithm to learn the multiple pieces of measured data from the database, and configured to analyze rules for how a position of the capsule changes with the multiple pieces of measured data, so as to establish a training model; and a capsule positioner connected to the training model establisher, and configured to use the training model to instantly position the capsule flowing in a human body to obtain a position of the capsule in the human body, wherein an error gain calculator is configured to substitute the position of the capsule that is positioned by the capsule positioner using the training model at a current time point, an estimated position of the capsule at the current time point and an estimated position of the capsule at a previous time point into following equation to calculate a gain:

$$S = K \times Z + (1 - K) \times X,$$

wherein S represents the estimated position of the capsule at the current time point, K represents the gain, Z represents the position of the capsule that is positioned at the current time point by the capsule positioner using the training model, and X represents the estimated position of the capsule at the previous time point.

2. The artificial intelligence capsule positioning system according to claim 1, wherein the artificial intelligence capsule positioner further includes:

a capsule flowing speed calculator connected to the capsule positioner, and configured to calculate a flow speed of the capsule in the human body according to a length of time that the capsule is placed into the human body and the position of the capsule in the human body from the capsule positioner.

3. The artificial intelligence capsule positioning system according to claim 1, wherein the artificial intelligence capsule positioner further includes:

the error gain calculator connected to the capsule positioner, and further configured to determine a ratio relationship between the estimated position of the capsule at the current time point and the position of the capsule that is positioned by the capsule positioner using the training model to calculate the gain.

4. The artificial intelligence capsule positioning system according to claim 3, wherein the training model establisher is connected to the error gain calculator, and configured to determine whether or not the training model is to be retrained according to the gain calculated by the error gain calculator.

5. The artificial intelligence capsule positioning system according to claim 1, wherein the plurality of signal receivers respectively receive the plurality of capsule signals via BLUETOOTH wireless transmission.

6. The artificial intelligence capsule positioning system according to claim 1, wherein the multiple pieces of measured data of the database further include data of a broadcast channel through which each of the plurality of capsule signals is transmitted by the signal transmitter.

7. The artificial intelligence capsule positioning system according to claim 6, wherein the broadcast channel includes a BLUETOOTH broadcast channel.

8. The artificial intelligence capsule positioning system according to claim 1, wherein each of the plurality of signal receivers includes one or more antennas.

* * * * *